Christian G. Spengler's Imp'd Dummy Engine.
118291  
PATENTED AUG 22 1871
Fig. 1.
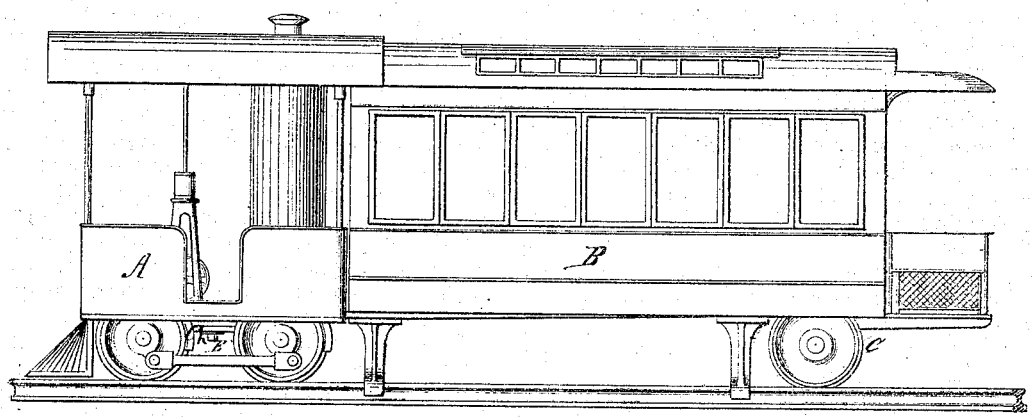
Fig. 2.
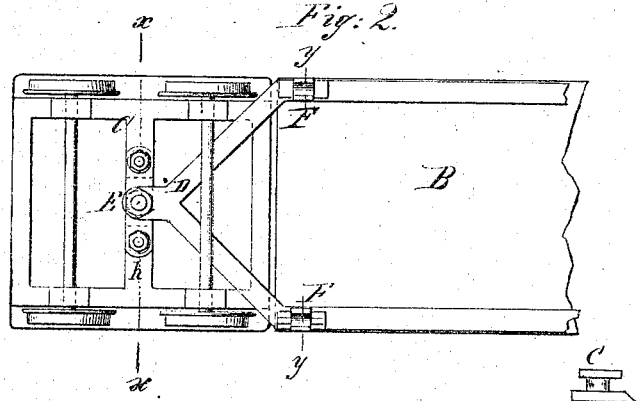
Fig. 3.
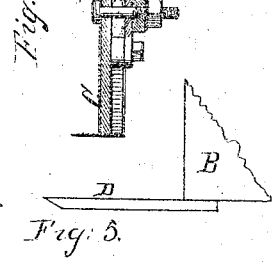
Fig. 4.
Fig. 5.
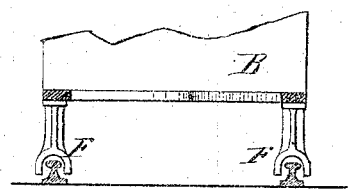
Witnesses.  
E. F. Kastenhuber  
C. Wahlers
Inventor.  
Chr. G. Spengler 118,291

UNITED STATES PATENT OFFICE.

CHRISTIAN GEORGE SPENGLER, OF HOBOKEN, NEW JERSEY.

IMPROVEMENT IN DUMMY-ENGINES.

Specification forming part of Letters Patent No. 118,291, dated August 22, 1871.

*To all whom it may concern:*

Be it known that I, CHRISTIAN GEORGE SPENGLER, of Hoboken, in the county of Hudson and State of New Jersey, have invented a new and useful Improvement in Dummy-Engines; and I do hereby declare the following to be a full, clear, and exact description thereof, which will enable those skilled in the art to make and use the same, reference being had to the accompanying drawing forming part of this specification, in which drawing—

Figure 1 is a side elevation of my improvement. Fig. 2 is an under-side view, the outer end of the burden portion being broken away. Fig. 3 is a detail in section, taken in the line $x\ x$ of Fig. 2, through the joint which connects the traction and burden parts to each other. Fig. 4 is a cross-section in the line $y\ y$ of Fig. 2, through the combined guard-rests. Fig. 5 is a detached view of parts constituting the coupling.

Similar letters indicate corresponding parts.

This invention relates to dummy-engines so called; and it consists in the method of connecting the traction and burden portions, as will be hereinafter more fully described.

A B designate the engine, whereof A is the traction part or division containing the engine, and B the burden division. C C designate the trucks of the engine, one supporting the traction division, and the other the rear end of the burden part. The divisions A B are connected to each other by the reach D, made triangular in shape, and extended from the forward end of the division B to the middle of the frame of the truck supporting the division A, where it is coupled by the bolt E and nut G. The reach D is made sufficiently strong to sustain the weight of the part B and its load. When this latter division is disconnected it is supported in an upright position from the railroad track by the rests F, which extend downward at each side from its bottom toward the rails and in front of the wheels C. These rests are made of such length that they will be near the top of the rails without touching them when the divisions are connected, and when disconnected they will drop down upon the rails. To couple the parts the division B must be lifted sufficiently to bring the reach D level with its place on the truck of the forward division. This I propose to accomplish by the engine itself, and for that purpose I make the forward end of the coupling beveled upon its under side, and provide a corresponding bevel on the plate $h$, as shown in Fig. 5, which forms the lower portion of the socket affixed to the truck of the division A. By backing the engine toward the part B the bevel of the coupling rides up the inclined plate $h$, thereby automatically lifting the division B sufficiently to clear the rests from the rails and bringing the parts into the proper position to receive the coupling-bolts. Without this position it would be almost impossible to lift the division B when loaded, and the difficulty attending it would render the dummy-engine practically worthless. The rests F may also serve as safety-guards, to prevent lateral displacement of the burden division of the dummy-engine both when connected and disconnected. This result is attained by extending over and down each side the rails, as shown in Fig. 4, whereby dangerous oscillations of the dummy-engine are counteracted and controlled, and comparative safety secured while in motion.

Having thus described my invention, what I claim as new therein, and desire to secure by Letters Patent, is—

The reach D, secured to and extending forward of the burden division B, and the coupling-socket affixed to the center of the truck supporting the traction division, when the forward end of the reach and the plate $h$ of the socket are beveled as described, in combination with the rests F, as herein set forth and shown, for the purposes specified.

C. G. SPENGLER.

Witnesses:
 J. VAN SANTVOORD.
 E. F. KASTENHUBER.